United States Patent
Kammel et al.

(10) Patent No.: US 6,755,405 B2
(45) Date of Patent: Jun. 29, 2004

(54) RUBBER BEARING COMPRISING A REINFORCING ELEMENT

(75) Inventors: Helmut Kammel, Damme (DE); Bernd Kümper, Damme (DE); Jim Robinson, Howell, MI (US)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 58 days.

(21) Appl. No.: 10/148,742

(22) PCT Filed: Sep. 27, 2001

(86) PCT No.: PCT/DE01/03707

§ 371 (c)(1),
(2), (4) Date: May 30, 2002

(87) PCT Pub. No.: WO02/29275

PCT Pub. Date: Apr. 11, 2002

(65) Prior Publication Data

US 2002/0186905 A1 Dec. 12, 2002

(30) Foreign Application Priority Data

Oct. 5, 2000 (DE) .......................................... 100 49 611

(51) Int. Cl.⁷ ................................................ F16F 1/387
(52) U.S. Cl. .................................... 267/293; 267/141.1
(58) Field of Search ................................. 267/292, 293, 267/294, 141.3, 141.4, 141.1, 141.2; 384/220, 222, 435, 436

(56) References Cited

U.S. PATENT DOCUMENTS 4,667,943 A * 5/1987 Izumi et al. ............. 267/141.3
5,437,439 A * 8/1995 Brokamp et al. ........... 267/293

FOREIGN PATENT DOCUMENTS

| DE | 42 04 252 A1 | 8/1993 | | |
|----|---|---|---|---|
| DE | 44 13 666 C1 | 6/1995 | | |
| EP | 1 065 078 A1 | * 3/2001 | | |
| FR | 2 683 874 A1 | * 5/1993 | | ................. 384/217 |
| GB | 2 033 955 A | * 5/1980 | | |
| JP | 08219210 | 8/1996 | | |
| JP | 09072365 | 3/1997 | | |
| JP | 2000110877 | 4/2000 | | |

* cited by examiner

Primary Examiner—Thomas Williams
(74) Attorney, Agent, or Firm—McGlew and Tuttle, P.C.

(57) ABSTRACT

A rubber bearing with an approximately cylindrical reinforcing element made of one or more insert parts, with each part extending in the axial direction of the bearing. The one or more insert parts are vulcanized into an elastomer of a bearing body between an inner and outer surface of the bearing body. The one or more insert parts having adjacent edges extending axially parallel with a non-straight, mutually complementary edge profile. An intermediate space formed between the adjacent edges of the one or more parts is filled with the elastomer of the bearing body.

12 Claims, 4 Drawing Sheets

RUBBER BEARING COMPRISING A REINFORCING ELEMENT

FIELD OF THE INVENTION

The present invention pertains to a rubber bearing with one or more reinforcing elements vulcanized into the elastomer of the bearing body, wherein the approximately cylindrical reinforcing element or reinforcing elements comprises/comprise one or more insert parts. The reinforcing element or optionally the reinforcing elements is/are arranged in the elastomer around the bearing axis and it reinforces/they reinforce the bearing especially with respect to radially acting forces. They consist of, e.g., a hard plastic or sheet metal. The deformation characteristics of the bearing can be specifically influenced by the number of reinforcing elements as well as their material and their dimensioning in terms of the thickness of the material. If the bearing has a plurality of reinforcing elements, these are integrated in the elastomeric bearing body at differently spaced locations from the bearing axis.

The present invention pertains to bearings in which the reinforcing elements have adjacent edges extending axially in parallel due to their shape or, in the case of reinforcing elements of a multipart design, due to the arrangement of the insert parts. In the case of reinforcing elements of a multipart design, there are such edges in the transition area between the individual insert parts. On the other hand, there are bearings in which the reinforcing element has a one-part design, but it has a slot or cut extending in the axial longitudinal direction of the bearing, so that two axially parallel edges are formed here as well. The slot makes possible the opening or folding open of the bearing body and thus simplifies its mounting on a rod to be mounted therein.

BACKGROUND OF THE INVENTION

Rubber bearings are used in large numbers in the automobile industry. These bearings, in which the bearing body has a longitudinal slot, are used here, e.g., to mount stabilizers, i.e., torsion rods, which are used to reduce the tilt of the vehicle body in curves in order to prevent the oversteering of the vehicle during travel in a curve. Depending on the design specifications, slide bearings or prior-art bearings without slidable bearing inner surfaces are used for mounting the stabilizers or torsion rods.

A corresponding bearing suitable for mounting stabilizers has already become known through DE 42 04 252 A1. This document describes a plastic bearing, which is designed as a slide bearing. The bearing has a continuous slot in the longitudinal direction through the bearing body in the known manner. The reinforcing element is formed by an insert part made of plastic, which is integrated in the bearing body and has increased hardness compared with the rest of the bearing body. Due to the longitudinal slot traversing both the elastomer and the reinforcing insert, the bearing can be opened by pushing up its half shells for mounting on a stabilizer. After it has been placed on the rod, the bearing body closes because of the elasticity of its material and then surrounds the rod in a ring-shaped manner. In practice, the bearing is subsequently mounted on the vehicle body by means of a strap or the like. The bearing shells are pretensioned against one another by the strap surrounding the bearing.

Another embodiment of such a bearing is described in DE 44 13 666 C1. In the bearing shown in this document, the two bearing half shells have a specially designed web connection on the side located opposite the slot, by which one bearing shell can be tilted by 180° in relation to the other around a fulcrum point and the bearing can thus be opened. This bearing also has a reinforcing insert for coordinating its deformation characteristics.

One drawback of the bearings described so far is that axially extending edges of the particular reinforcing element integrated in the bearing body strike each other under cardanic load as a consequence of a relative movement between the half shells after the mounting of the bearing and the subsequent pretensioning of its bearing shells. As a result, the edges rub against one another, which in turn causes undesired noises. A similar situation can also be observed in bearings in which the bearing body is not slotted, but the reinforcing element or reinforcing elements comprises/comprise a plurality of insert parts, which are pretensioned against one another after the mounting.

SUMMARY OF THE INVENTION

The technical object of the present invention is therefore to provide a rubber bearing which has one or more reinforcing elements for setting its deformation characteristics and in which no noises are caused by hard parts rubbing against each other under cardanic load despite the presence of mutually adjacent edges of the reinforcing element or reinforcing elements pretensioned against one another.

The rubber bearing according to the present invention comprises in the known manner a bearing body in which one or more one-part or multipart reinforcing elements are vulcanized into the elastomer. These reinforcing elements have adjacent edges extending axially parallel due to their shape or their multipart design in relation to one another. In the manner according to the present invention, the insert parts, which form the reinforcing element or reinforcing elements, are designed such that the edges of the reinforcing element or reinforcing elements, which edges are adjacent to one another and extend axially parallel in the mounted state of the bearing, have a non-straight, mutually complementary edge profile. At the same time, the intermediate spaces formed between the edges based on their profiling are filled with the elastomer. The edges are reliably prevented from rubbing against each other by the elastomer seated between the edges even under higher cardanic load on the bearing. The generation of noise known in the case of bearings designed according to the prior art under such a load is effectively prevented hereby from occurring. According to one embodiment of the bearing, the edges of the insert parts forming the reinforcing element or reinforcing elements, which edges adjoin one another and are consequently adjacent to one another, have a plurality of recesses. Following the basic principle according to the present invention, according to which the edges are profiled in a mutually complementary manner, these recesses are arranged offset in relation to one another relative to two adjacent edges each. In addition, the distances between the recesses are always smaller than the length of the recesses in the opposite edge. As a result, the contours of the two edges mesh with one another, of course, in a comb-like or tooth-like manner, while mechanical uncoupling is achieved at the same time by the elastomer arranged between them. Various profiles are conceivable for designing such toothed edges. Thus, the edges may be profiled by approximately rectangular recesses, but also in a sawtooth-like, trapezoidal or similar manner. The insert parts are additionally prevented from being axially displaced in relation to one another by the toothed meshing of the insert parts.

In the case of a two-part design of the reinforcing element or reinforcing elements, the insert parts are, moreover, additionally designed such that the two edges of one particular part are also profiled in a mutually complementary manner. As a result, it is possible to use identical insert parts for both halves of the bearing. Based on the design explained above, these can be fitted together regardless of which of their axial ends is rotated in the direction of which axial bearing end during the insertion into the mold used for the vulcanization. For use for mounting rods, e.g., stabilizers, the elastomer of a bearing designed in such a manner has an axial longitudinal slot preferably in the area of the transitions between the insert parts forming the reinforcing element or the reinforcing elements in order to facilitate the mounting of the bearing. However, it is also possible in case of a corresponding design of the elastomer enclosing the insert parts to support the mounting by the elastomer without an axial slot. For example, in a bearing with a reinforcing element comprising two insert parts, the elastomer may have a thin web in the area of the transitions between the two insert parts instead of a continuous slot. As a result, the bearing body can be pulled apart radially for mounting on a rod in the area of these rods and pushed at the same time over the rod in the axial direction. As soon as the forces directed radially outwardly for the pulling apart of the bearing body are no longer present, the bearing surrounds the rod to be mounted closely in the position intended for this.

Another embodiment of the bearing is given by the one-part design of the reinforcing element or reinforcing elements. A reinforcing element is designed in this case quasi as a cylinder jacket, which does, however, have an axially extending slot, which makes it possible to push on or open the bearing, for use as a stabilizer bearing. To additionally support the opening and subsequent closing of the bearing during mounting, slots or recesses likewise extending in the longitudinal direction are arranged in some areas opposite the continuous slot in this embodiment according to a variant of the present invention. The deformation of the entire bearing during mounting is simplified hereby.

Regardless of whether the reinforcing elements have a one-part or multipart design, the surfaces of the insert parts forming them additionally have, moreover, radially circular reinforcing ribs according to another advantageous embodiment. By selecting their number and dimensioning, there is an additional possibility of specifically affecting the deformation characteristics of the bearing, i.e., its characteristics. In addition, radial flanges may be provided at the axial ends of the insert parts to form axial stops. An embodiment of the bearing in which the insert parts have a plurality of openings (holes or punched-out openings) distributed on their surfaces, proved to be advantageous from a manufacturing technical viewpoint. This is advantageous insofar as the elastomer can pass through these openings during the vulcanization. An increased pressure is prevented as a result from developing and acting on the reinforcing elements during the vulcanization and the reinforcing elements are thus prevented from being deformed in an unintended manner.

The reinforcing elements, which are usually approximately cylindrical, may have flattened areas on their circumference due to a corresponding design of the insert parts forming them. As a result, bearings with different characteristics with respect to their circumference are obtained for special applications. Depending on the intended purpose, the bearing body of the bearing according to the present invention, which consists essentially of elastomer, may also be vulcanized on a metallic inner part or have one or more slidable areas on its inner sides to form a slide bearing. A reinforcing element, which is profiled in the manner being shown and is arranged in the radially outer area of the bearing body, may, moreover, form a housing or an outer sleeve for the bearing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
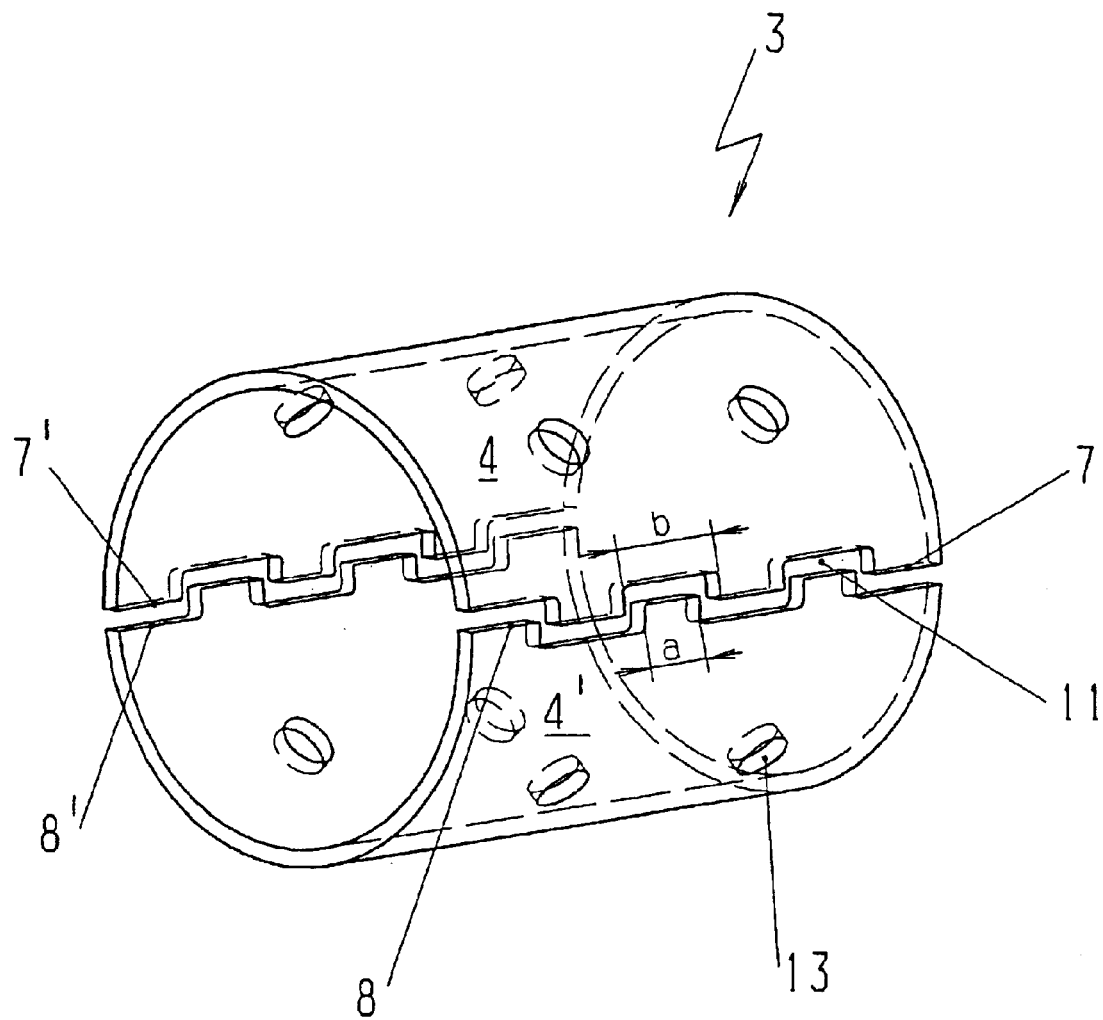
FIG. 1 is a perspective view showing a two-part reinforcing element for the bearing according to the present invention.

Referring to the drawings in particular, FIG. 1 shows a two-part reinforcing element 3 for the bearing according to the present invention in a three-dimensional view. These are, e.g., two sheet metal parts 4, 4' fitted together corresponding to the figure, which are fitted together in the manner shown and are vulcanized into the bearing body 1 consisting otherwise essentially of rubber in a vulcanization mold. The profiling of the edges 7, 7', 8, 8' of the two insert parts 4, 4' forming the reinforcing element 3, which edges are located next to one another, i.e., are adjacent to one another in the view, can be clearly recognized compared with the state of the art. These edges 7, 7', 8, 8' are profiled according to FIG. 1 such that they have recesses 11 or punched-out openings in some sections. Corresponding to the basic principle of the present invention, the profiling is designed such that the recesses 11 of the edges 7, 8 and 7', 8' located adjacent to one another are arranged complimentarily to one another. The distances a between the openings are selected to be smaller compared with the radial extension b of the recesses 11. As a result, the insert parts 4, 4' mesh with one another in a comb-like or quasi tooth-like pattern. Profiling shapes other than those shown in the view are, of course, also conceivable for this purpose for the edges 7, 7', 8, 8'. The profiled edges 7, 7', 8, 8' of the insert parts 4, 4' are located next to one another in the view. However, insofar as adjacent edges 7, 7', 8, 8' and 9, 10 are always referred to in this connection, this accounts for the fact that it is an essential element of the present invention that precisely these edges 7, 7', 8, 8' and 9, 10 do not touch each other any longer after the reinforcing element 3 has been vulcanized into the elastomer 2 essentially forming the bearing body 1. The rubber compound, which will cure later, is rather settled between the gaps formed based on the complementary structuring of the edges 7, 7', 8, 8' and 9, 10 during the vulcanization and prevents the edges 7, 7', 8, 8' and 9, 10 from rubbing against each other during the use of the bearing and the cardanic load occurring during use and consequently it prevents rubbing noises from being generated. In the two-part embodiment of the reinforcing element 3 shown in FIG. 1, the two edges 7, 7' and 8, 8' of every individual respective part 4 and 4' also have mutually complementary profiling. As a result, it is possible to prepare an axially symmetrical reinforcing element 3 from two identical insert parts 4, 4' in a favorable manner from the viewpoint of manufacturing technology by fitting together the insert parts 4, 4' as shown. Due to the described design of the insert parts 4, 4', it is now completely irrelevant which axial end of the insert parts 4, 4' coincides with which axial end of the later bearing. It is therefore not necessary to take into account the axial orientation of the parts during their insertion into the vulcanization mold. Furthermore, it is advantageous for the vulcanization process that the insert parts 4, 4' have a plurality of openings 13 in the form of holes or punched-out openings distributed on their surface. As a result, the rubber can pass over from one side of the insert part 4 or 4' to the other side via the openings 13 and thus "flow around" the insert parts 4 and 4' better on all sides, as a result of which forces that could lead to an unintended deformation of the sheet metal insert parts 4 and 4' are in turn reduced.

Figure 2:
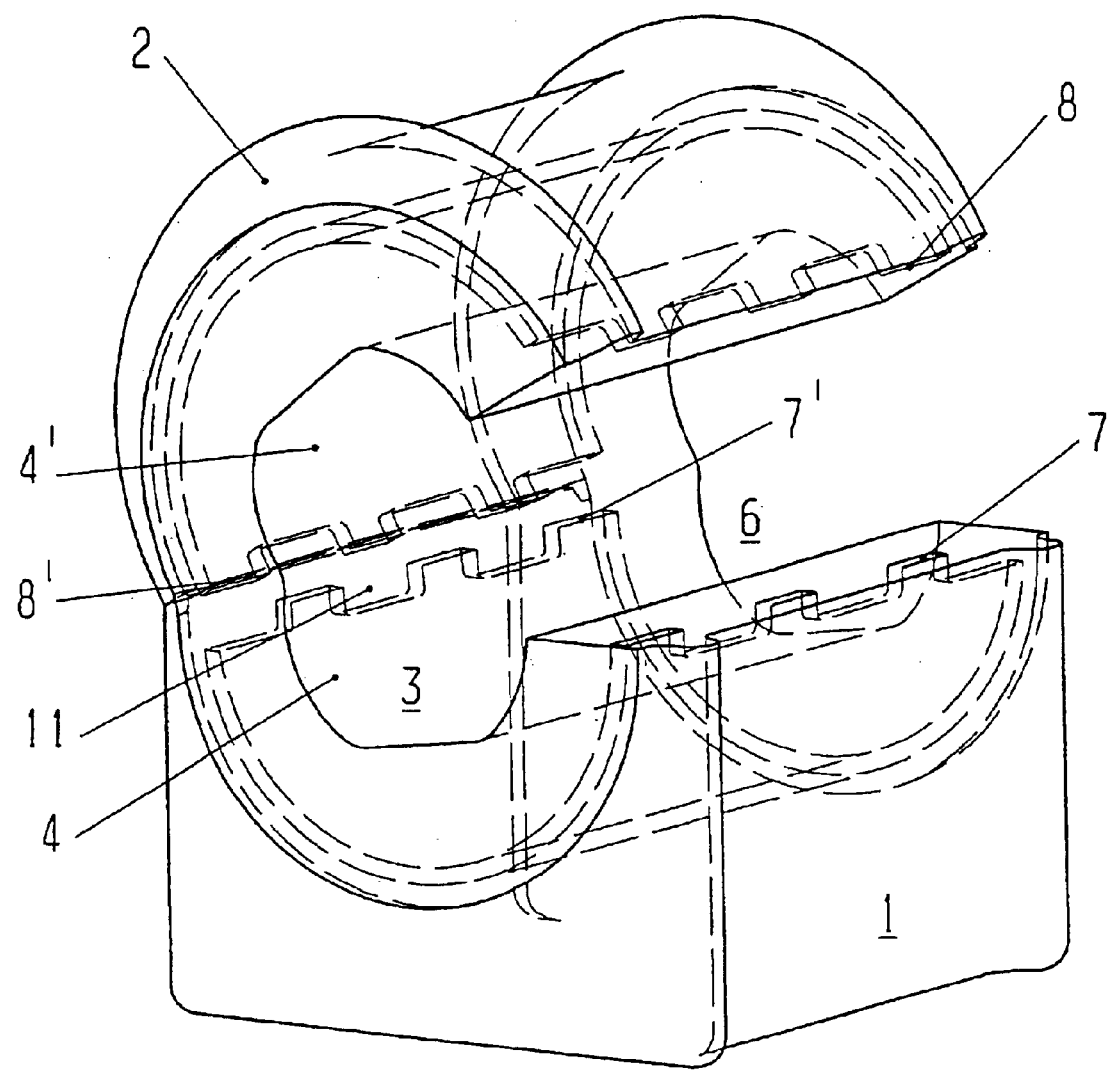
FIG. 2 is perspective view of a rubber bearing with a reinforcing element according to FIG. 1 in the slightly opened state.

FIG. 2 shows the complete rubber bearing with the reinforcing element 3 profiled corresponding to the present invention at the adjacent edges (cut edges) 7, 7', 8, 8'. This is a reinforcing element 3 comprising two insert parts 4, 4' according to FIG. 1 explained above. The bearing has a longitudinal slot 6, which does, of course, coincide, with respect to the reinforcing element 3, with one of the transition points between the two insert parts 4, 4' forming the reinforcing element 3. For mounting, e.g., on a torsion rod (stabilizer), the bearing can be easily opened according to the view shown in FIG. 2. The bearing is pushed over the rod in the opened state, and it again closes because of the restoring forces caused by the properties of its material. If the bearing is used to mount motor vehicle stabilizers, the bearing is finally fastened to the body of a motor vehicle by means of a clip or the like. The bearing half shells, i.e., also the half shells (insert parts 4, 4') of the reinforcing element 3 embedded therein, are now pretensioned against one another.

Figure 3:
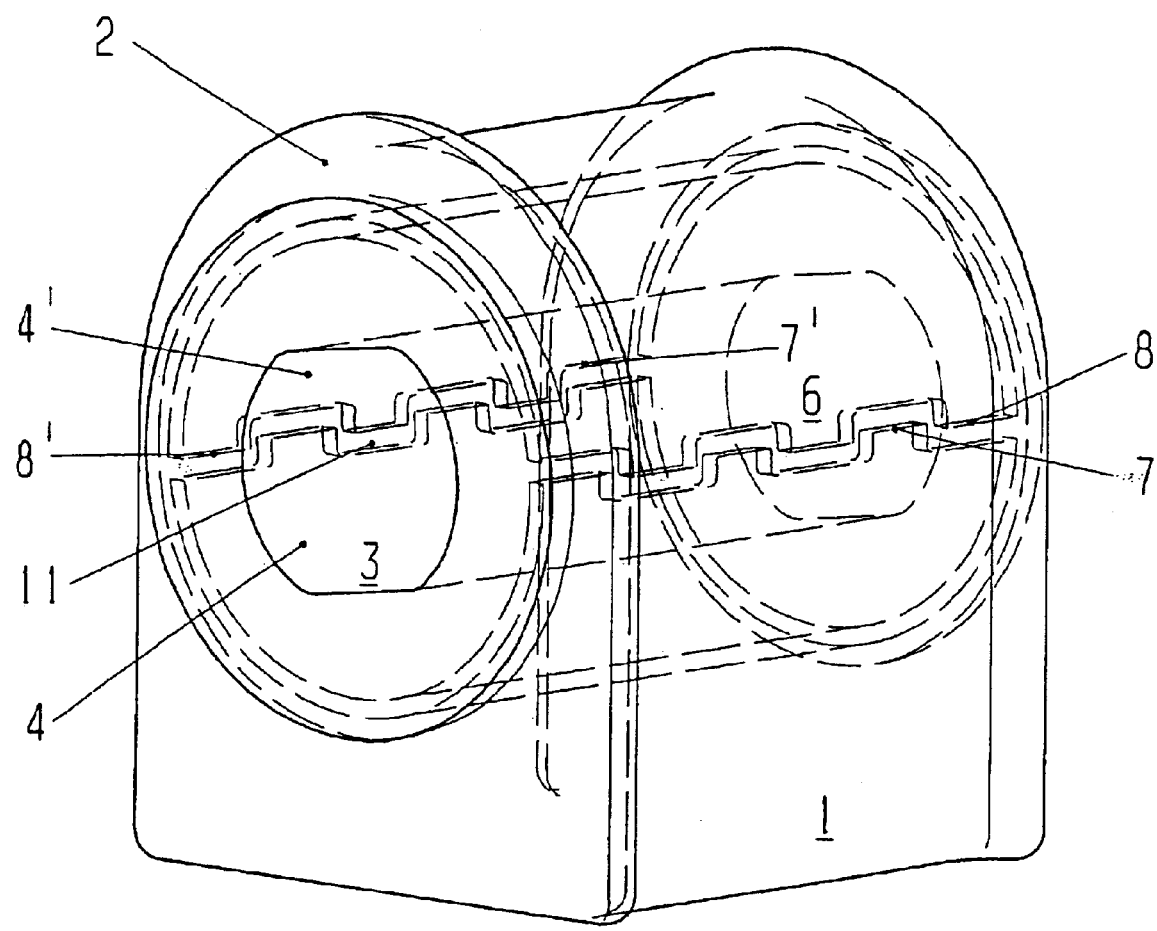
FIG. 3 is a perspective view of the rubber bearing according to FIG. 2 in the closed (mounted) state.

FIG. 3 shows the bearing in the closed state after the mounting, but without representation of a clip optionally used to fasten it. It can be clearly recognized how the recesses 11 and punched-out openings of the insert parts 4, 4', which are arranged complimentarily to one another, mesh with each other in a comb-like manner. However, the intermediate spaces formed between them are filled by the elastomer 2 forming the rest of the bearing body 1, so that the parts do not come directly into contact by their edges 7, 7', 8, 8' and 9, 10 even under a higher cardanic load. As a result, the parts are prevented from rubbing against each other and the generation of noise which results herefrom in the prior art is prevented from occurring as a consequence. Corresponding to the intended purpose of the bearing, the insert parts 4, 4' and 5 may also have, unlike in the embodiment shown, a radial flange on their axial front sides, which forms an axial stop for limiting axial forces. Insofar as the bearing is a slide bearing, it also has on its inner sides correspondingly designed sliding surfaces, which are likewise integrated in the bearing body 1 in the course of the vulcanization.

Figure 4:
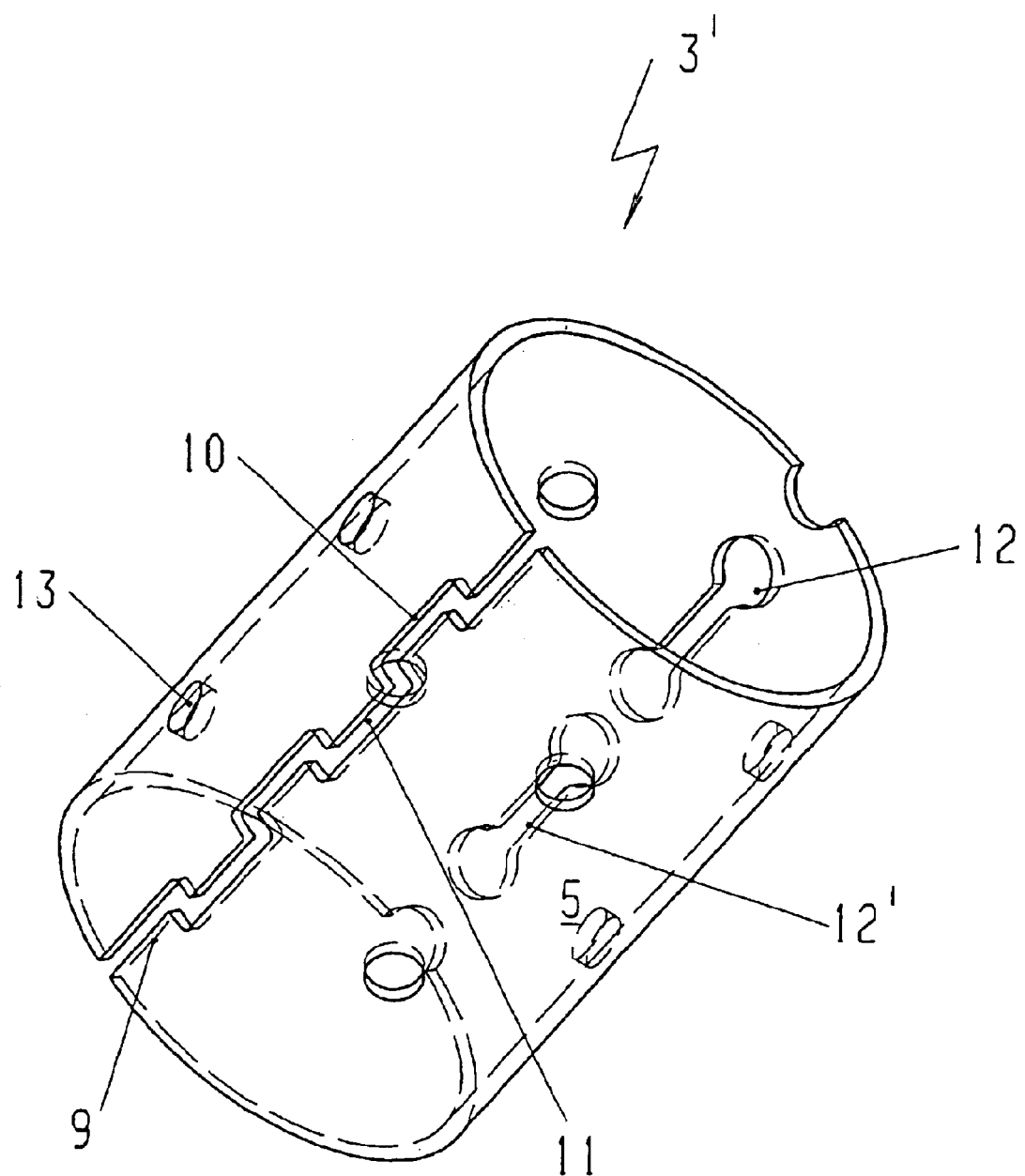
FIG. 4 is a perspective view of a one-part reinforcing element for the rubber bearing according to the present invention.

FIG. 4 shows a one-part embodiment of the reinforcing element 3'. Only two material edges 9, 10 adjoining each other are present in this embodiment. However, following the principle of the present invention shown, these are likewise profiled in a complementary manner in relation to one another. To facilitate the mounting of a bearing provided with such a one-part reinforcing element 3', the insert part 5 has a plurality of slots or openings 12, 12' extending in the longitudinal direction in its circumferential surface on the side located opposite the profiled edges 9, 10. The deformation of the bearing is markedly simplified when it is pushed over, e.g., a stabilizer rod. The length and the number of the openings 12, 12' which are preferably to be provided for this purpose depend on the material of the insert part 5 and its material thickness. These parameters depend, in turn, on the desired deformation behavior of the bearing.

What is claimed is:

1. A rubber bearing, comprising:
a cylindrical reinforcing element comprising one or more insert parts each extending in the axial direction, said one or more insert parts being vulcanized into an elastomer of a bearing body between an inner surface of the bearing and an outer surface of the bearing, said one or more insert parts having adjacent edges extending axially parallel with a non-straight, mutually complementary edge profile and with an intermediate space formed between said adjacent edges filled with said elastomer, said intermediate space being formed of a plurality of substantially uniformly spaced recesses wherein said edges mesh with one another in a comb-like or tooth-like manner due to an offset existing between their recessed areas because of the mutually complementary design and due to a distance between two said recesses of one edge being shorter than an axial length of a recess located on an opposite edge, and mechanical uncoupling is provided by said elastomer.

2. A rubber bearing in accordance with claim 1, wherein said reinforcing element is/are formed by two identical insert parts, wherein two said axially extending edges of each said insert part are profiled in a mutually complementary manner.

3. A rubber bearing in accordance with claim 1, wherein said reinforcing element comprises a cylindrical insert part with an axial longitudinal slot with edges having a non-straight mutually complementary edge profile.

4. A rubber bearing in accordance with claim 3, wherein said one or more insert parts have slots extending in the axial direction on their side located opposite said axial longitudinal slot.

5. A rubber bearing in accordance with claim 1, wherein surfaces of said reinforcing element are profiled in some sections to form additional, radially circular reinforcing ribs.

6. A rubber bearing accordance with claim 1, wherein said reinforcing element has at axial ends a radial flange, which forms a stop for forces introduced axially.

7. A rubber bearing in accordance with claim 1, wherein said insert parts have a plurality of openings in the form of holes or punched-out openings distributed on surfaces of said insert parts.

8. A rubber bearing in accordance with claim 1, wherein said reinforcing element has flattened areas on a circumference thereof, said flattened areas providing a deviation from an essentially cylindrical shape.

9. A rubber bearing in accordance with claim 1, wherein the bearing has one or more slidable areas on its bearing inner sides to form a slide bearing.

10. A rubber bearing in accordance with claim 1, wherein the elastomeric bearing body including said reinforcing element is vulcanized onto a metallic inner part.

11. A rubber bearing, comprising:
a reinforcing element comprising one or more insert pairs each extending in an axial direction, said one or more insert parts being vulcanized into an elastomer of a bearing body between an inner surface of the bearing and an outer surface of the bearing, said one or more insert parts having adjacent edges extending axially parallel with a non-straight, mutually complementary edge profile and with an intermediate space formed between said adjacent edges filled with said elastomer, said reinforcing element having flattened areas on a circumference thereof, said flattened areas providing a deviation from a substantially cylindrical shape.

12. A rubber bearing, comprising:

a reinforcing element comprising one or more insert parts each extending in an axial direction, said one or more insert parts being vulcanized into an elastomer of a bearing body between an inner surface of the bearing and an outer surface of the bearing, said one or more insert parts having adjacent edges extending axially parallel with a non-straight, mutually complementary edge profile and with an intermediate space formed between said adjacent edges filled with said elastomer, said intermediate space being formed of a plurality of substantially uniformly spaced recesses wherein said edges mesh with one another in a comb-like or tooth-like manner due to an offset existing between their recessed areas because of the mutually complementary design and due to a distance between two said recesses of one edge being shorter than an axial length of a recess located on an opposite edge, and mechanical isolation is provided by said elastomer.

* * * * *